United States Patent
Jagadish et al.

(10) Patent No.: US 8,010,743 B2
(45) Date of Patent: Aug. 30, 2011

(54) AUTOMATIC RAID VOLUME GENERATION AND MIGRATION BASED ON APPLICATION TYPE

(75) Inventors: Divya Jagadish, Karnataka (IN); Anurag Sushil Chandra, Pune (IN)

(73) Assignee: LSI Corporation, Milpitas, CA (US)

( * ) Notice: Subject to any disclaimer, the term of this patent is extended or adjusted under 35 U.S.C. 154(b) by 406 days.

(21) Appl. No.: 12/333,327

(22) Filed: Dec. 12, 2008

(65) Prior Publication Data
US 2010/0153640 A1 Jun. 17, 2010

(51) Int. Cl.
*G06F 12/00* (2006.01)
(52) U.S. Cl. ......... 711/114; 711/156; 711/170; 711/173
(58) Field of Classification Search ....................... None
See application file for complete search history.

*Primary Examiner* — Shawn X Gu
(74) *Attorney, Agent, or Firm* — Prakash Nama; Global IP Services, PLLC

(57) ABSTRACT

A method and system of automatic redundant array of independent disks (RAID) volume generation based on an application type is disclosed. In one embodiment, a method for selecting a RAID level includes receiving setup data of an application type and a number of volumes for generating the RAID, assigning a level of the RAID in response to the application type and generating the number of volumes for the level of the RAID. The method may also include mapping the number of volumes to a host of the RAID, scanning the volumes for data written to the volumes and read from the volumes and evaluating the data to determine an appropriateness of the level of the RAID for the application type. Further, the method may include automatically migrating to another RAID level for the application if the level of the RAID is inappropriate.

20 Claims, 5 Drawing Sheets

US 8,010,743 B2

AUTOMATIC RAID VOLUME GENERATION AND MIGRATION BASED ON APPLICATION TYPE

FIELD OF TECHNOLOGY

Embodiments of the present invention relate to the field of electronics. More particularly, embodiments of the present invention relate to data management associated with a redundant array of independent disks (RAID).

BACKGROUND

In a traditional setup of redundant array of independent disks (RAID), a user creates one or more volumes of the RAID based on the user's prior experience, to a large extent. During the setup, the user evaluates an application type and selects a RAID level based on the user's experience and knowledge to create one or more RAID volumes. Then, the RAID volumes are mapped to one or more hosts so that data can be written to the RAID volumes.

However, the RAID volumes created at the RAID level may not be suitable for a particular application, although the application may be of the same application type. In such a case, the user may have to select another RAID level by going through the volume creation process once again. Thus, even after sustained and diligent effort, there is no guarantee that the RAID level selected is optimal for the application.

SUMMARY

A method and system of automatic redundant array of independent disks (RAID) volume generation based on an application type is disclosed. In one aspect, a method includes receiving setup data of an application type and a number of volumes for generating the RAID, assigning a level of the RAID in response to the application type, and generating the number of volumes for the level of the RAID. The method further includes mapping the number of volumes to a host of the RAID, where the host subscribes to an application of the application type. The method also includes scanning the volumes for data written to the volumes and read from the volumes, and evaluating the data to determine an appropriateness of the level of the RAID for the application type. Further, if the level of the RAID is determined as inappropriate, the method includes automatically migrating the application to another RAID level.

In another aspect, a RAID controller coupled to a host and a plurality of drive trays of different types for selecting a RAID level includes an input module for receiving setup data of an application type and a number of volumes for generating the RAID, a RAID select module for assigning a level of the RAID in response to the application type, and a volume generation module for generating the number of volumes for the level of the RAID.

The methods and/or systems disclosed herein may be implemented by any means for achieving various aspects, and may be executed in a form of a machine readable medium embodying a set of instructions that, when executed by a machine, cause the machine to perform any of the operations disclosed herein.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follows.

DETAILED DESCRIPTION

A method and system of automatic redundant array of independent disks (RAID) volume generation based on an application type is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
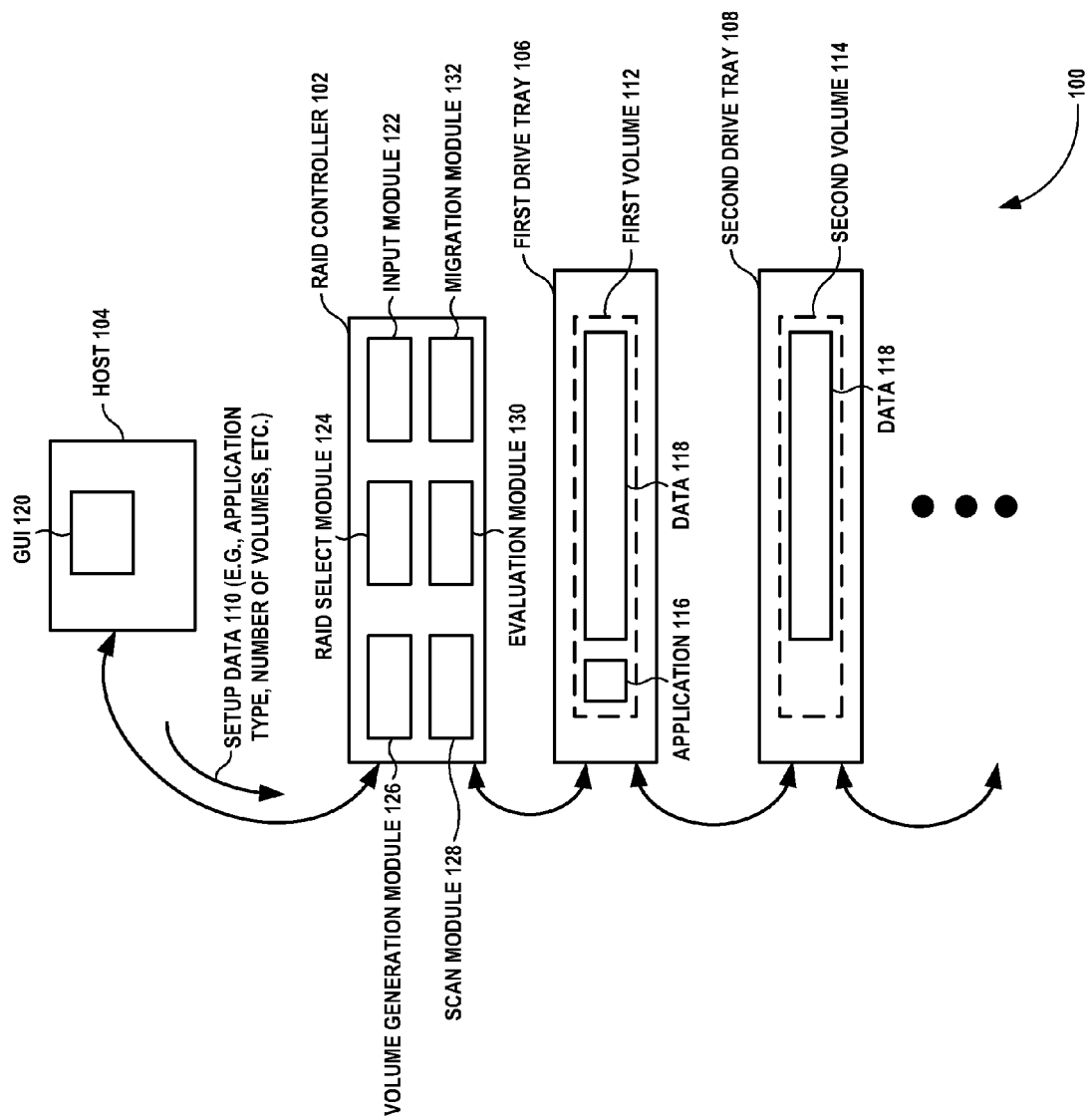
FIG. 1 illustrates an exemplary redundant array of independent disks (RAID) system for automatically generating RAID volumes based on an application type, according to one embodiment.

FIG. 1 illustrates an exemplary RAID system 100 for automatically generating RAID volumes based on an application type, according to one embodiment. As shown in FIG. 1, the RAID system 100 includes a RAID controller 102 coupled to a host 104 and multiple drive trays of different types, viz., a first drive tray 106, a second drive tray 108, etc. Further, as shown in FIG. 1, the RAID controller 102 includes an input module 122, a RAID select module 124, a volume generation module 126, a scan module 128, an evaluation module 130 and a migration module 132 for selecting a RAID level based on setup data 110. For example, the setup data 110 may include an application type and a number of volumes.

Also, as shown in FIG. 1, the host 104 includes a graphical user interface (GUI) 120 for querying the setup data 110. In one exemplary implementation, the host 104 subscribes to an application 116 of the application type to be stored in the RAID volumes. In addition, as shown in FIG. 1, the RAID system 100 includes the first drive tray 108 with a first volume 112, the second drive tray 108 with a second volume 114 and so on which store the application 116 and data 118.

In operation, the input module 122 receives the setup data 110 provided by a user through the GUI 120 to generate a RAID level. Further, the RAID select module 124 is operable to assign the RAID level in response to the application type. Furthermore, the volume generation module 126 generates the number of volumes for the assigned level of the RAID. In one embodiment, the number of volumes is mapped to the host 104 of the RAID system 100. Moreover, the application 116 and the data 118 are stored in the first volume 112 of the first drive tray 106 or the second volume 114 of the second drive tray 108 based on the RAID level assigned by the RAID select module 124.

Further, in accordance with the above described embodiments, the scan module 128 is operable to scan the first volume 112 and the second volume 114 for the data 118 written to the first volume 112 and the second volume 114 and read from the first volume 112 and the second volume 114. Furthermore, the evaluation module 130 evaluates the data 118 to determine an appropriateness of the RAID level for the application type. In one embodiment, a throughput of the data 118 and an access rate of the application 116 are measured to determine the appropriateness of the RAID level. If the RAID level is inappropriate, then the migration module 132 is operable to automatically migrate the application 116 to another RAID level.

Figure 2A:
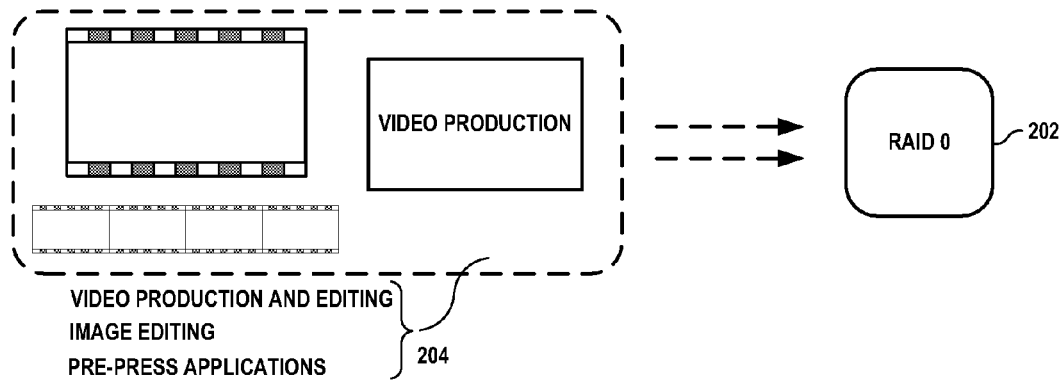
FIGS. 2A through 2F illustrate selection of a RAID level based on an application type, according to one embodiment.
Figure 2B:
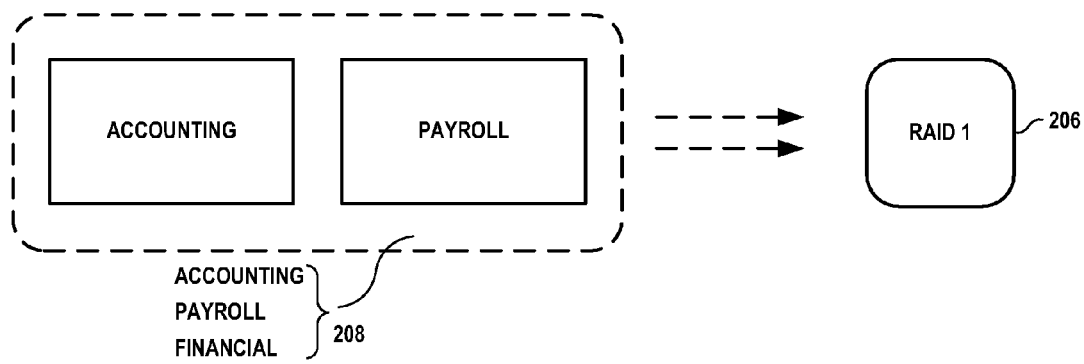

FIGS. 2A through 2F illustrate selection of a RAID level based on an application type, according to one embodiment. In one exemplary implementation, the level of the RAID is selected based on applications intended to run on RAID volumes, e.g., based on the application type. As shown in FIG. 2A, a RAID 0 202 is formed if an application 204 requires a high bandwidth, such as for video production and editing, image editing, or pre-press. FIG. 2B illustrates that RAID 1 206 is formed for applications 208 requiring very high availability, such as for accounting, payroll, or finance.

Figure 2C:
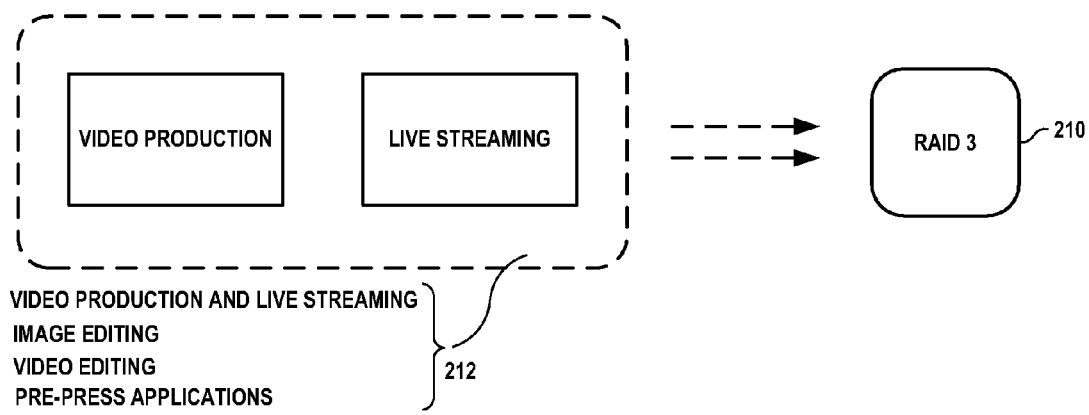
Figure 2D:
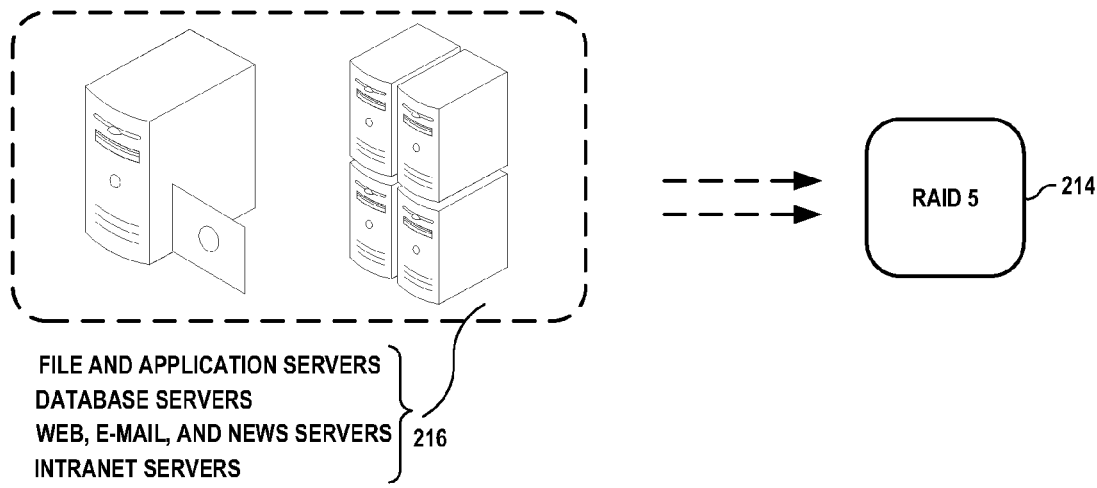

Further, FIG. 2C illustrates that a RAID 3 210 is formed for applications 212 requiring high throughput, such as for video production and live streaming, image editing, video editing, or pre-press. For applications 216 requiring a versatile RAID level, such as a file and application server, a database server, a web, email and news server, or an intranet server, a RAID 5 214 is formed as illustrated in FIG. 2D.

Figure 2E:
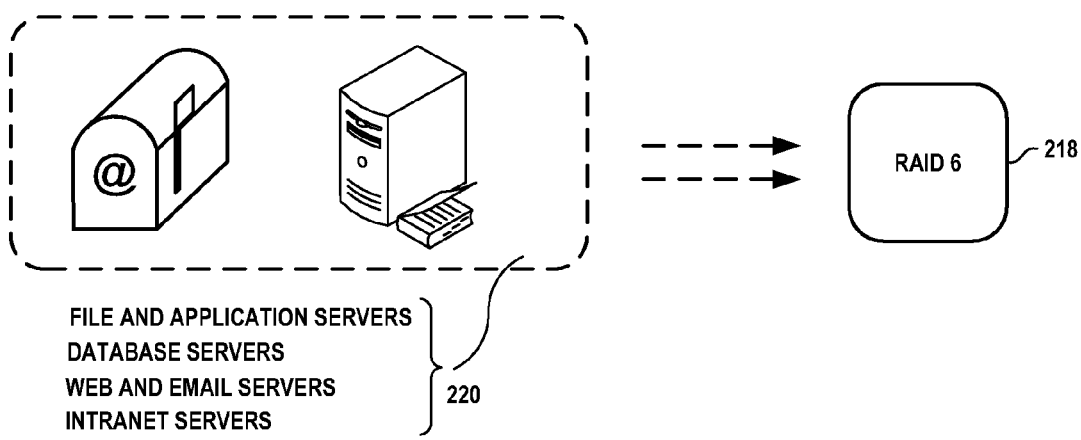
Figure 2F:
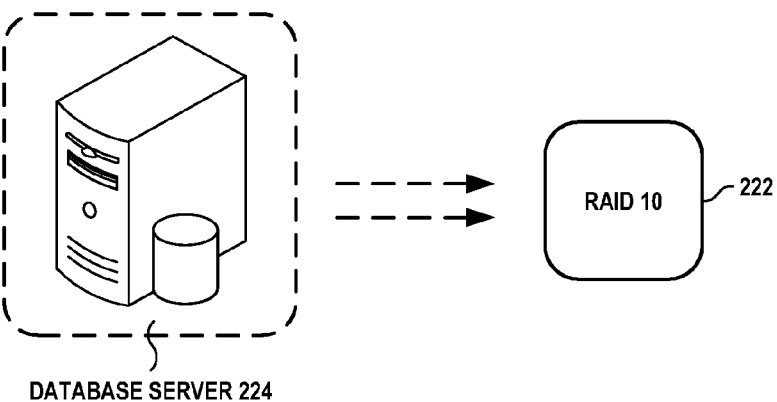

Also, for applications 220 requiring excellent fault-tolerance with lowest overhead, such as a file and application server, a database server, a web server, an email server, or an intranet server, a RAID 6 218 is formed as illustrated in FIG. 2E. Further, it can be seen from FIG. 2F that, for applications 224 requiring high performance and fault tolerance, such as a database server, a RAID 10 222 is formed.

Figure 3:
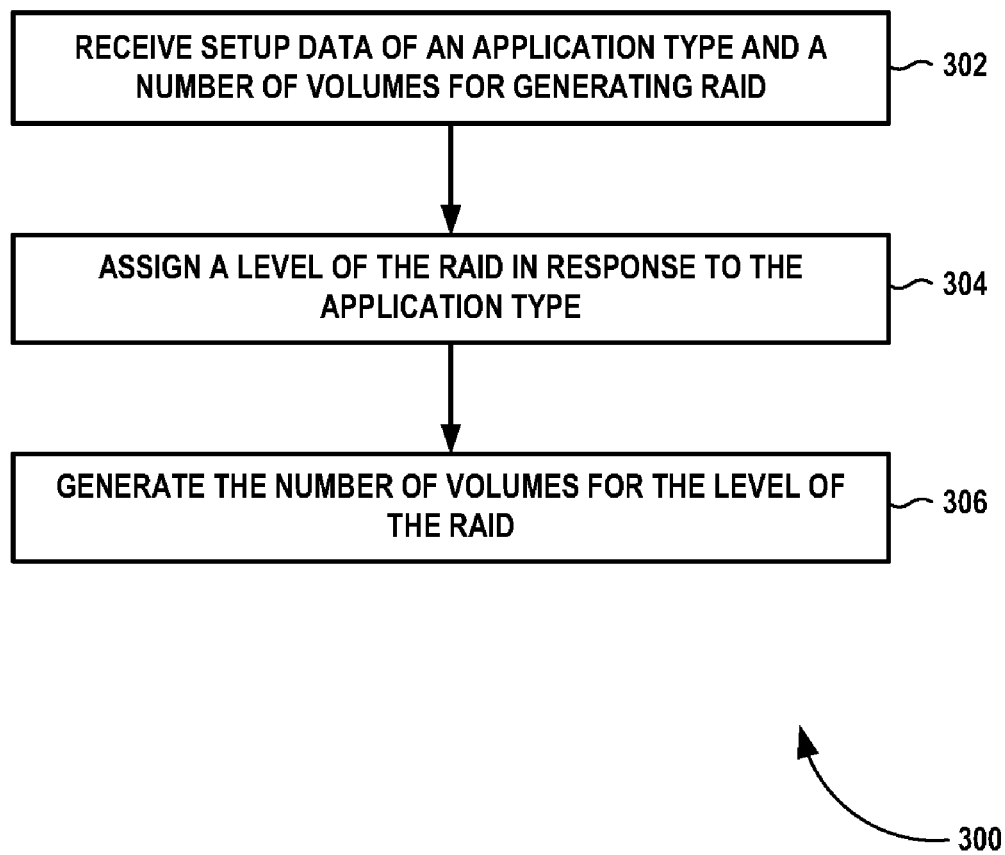
FIG. 3 is a process flow chart of an exemplary method for automatically generating RAID volumes based on an application type, according to one embodiment.

FIG. 3 is a process flow chart 300 of an exemplary method for automatically generating RAID volumes based on an application type, according to one embodiment. In operation 302, setup data of the application type and a number of volumes for generating the RAID is received. In operation 304, a level of the RAID is assigned in response to the application type. In operation 306, the number of volumes for the level of the RAID is generated. Moreover, in one example embodiment, a computer readable medium (e.g., firmware for an I/O processor and/or the RAID controller 102 associated with the RAID the RAID system) for selecting a RAID level having instructions that, when executed by a computer, cause the computer to perform the method illustrated in FIG. 3.

Figure 4:
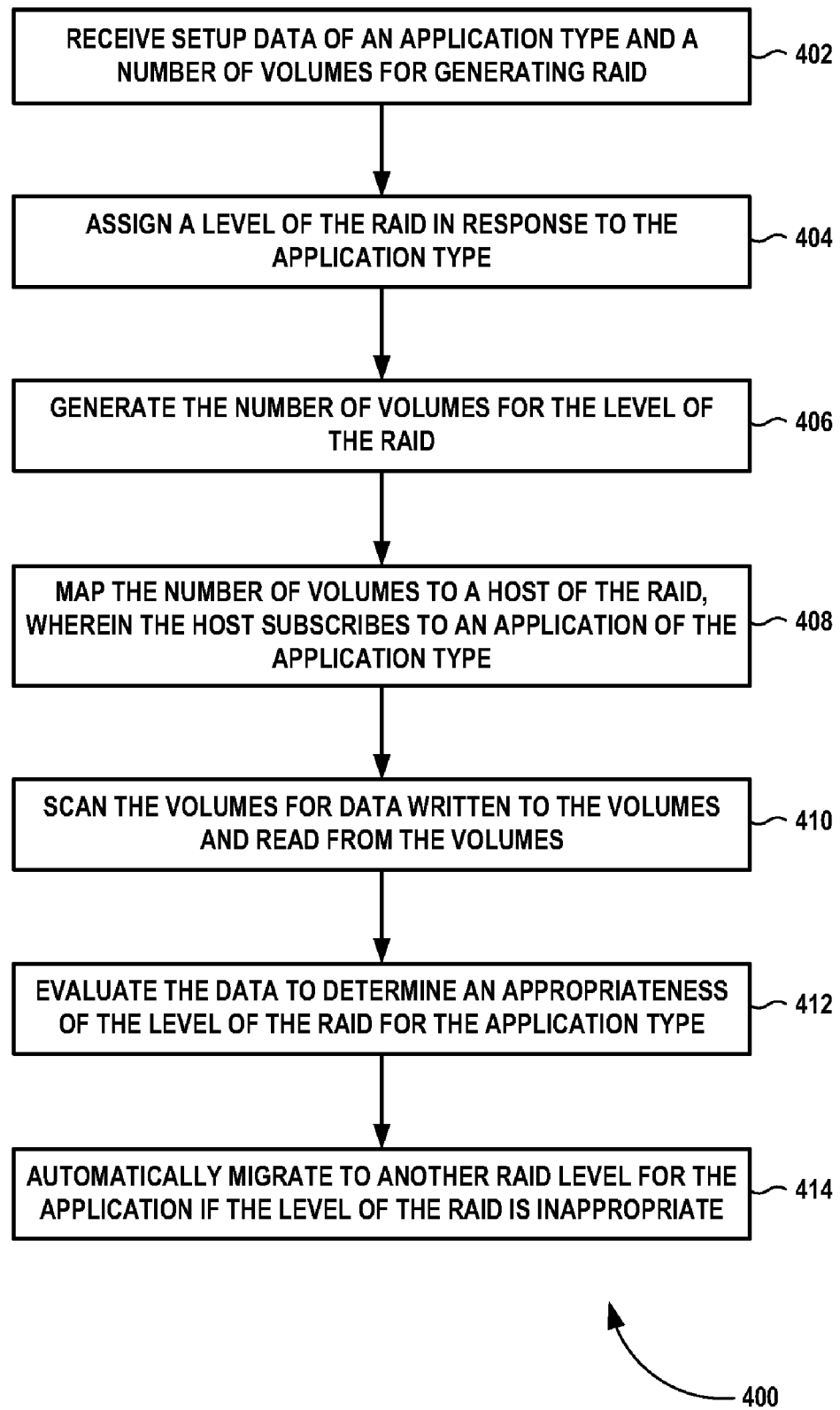
FIG. 4 is a process flow chart of another exemplary method for automatically generating RAID volumes based on an application type, according to one embodiment.

FIG. 4 is a process flow chart 400 of another exemplary method for automatically generating RAID volumes based on an application type, according to one embodiment. In operation 402, setup data of the application type and a number of volumes for generating the RAID is received. In operation 404, a level of the RAID is assigned in response to the application type. In operation 406, the number of volumes for the level of the RAID is generated. In operation 408, the number of volumes is mapped to a host of the RAID. In one exemplary implementation, the host subscribes to an application of the application type. In operation 410, the volumes are scanned for data, written to the volumes and read from the volumes.

In operation 412, the data is evaluated to determine an appropriateness of the level of the RAID for the application type. In one embodiment, the data evaluation includes measuring a throughput of the data and an access rate for the application. In operation 414, the application is automatically migrated to another RAID level if the level of the RAID is inappropriate. Moreover, in one example embodiment, a computer readable medium (e.g., firmware for an I/O processor and/or a RAID controller 102 associated with the RAID system 100) for selecting a RAID level having instructions that, when executed by a computer, cause the computer to perform the method illustrated in FIG. 4.

The above-described method and system ensure desired read/write throughput through selection of an appropriate RAID level. Further, the above-described method and system provide the user an option to select the appropriate RAID level based on the application that is to be stored in the RAID. Also, using the above-described method and system, the redundancy of the applications can be achieved such that 100 percent availability of the data is ensured. The above-described method and system require no user intervention and also ensure failsafe data storage in all kinds of storage subsystems, where RAID levels are implemented with improved read and write speeds. In addition, in the above-described method and system, the applications are stored on the basis of required redundancy.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A method for selecting a redundant array of independent disks (RAID) level, the method comprising:
    receiving setup data of an application type and a number of volumes for generating a RAID;
    assigning a level of the RAID in response to the application type; and
    generating the number of volumes for the assigned level of the RAID.

2. The method of claim 1, further comprising mapping the number of volumes to a host of the RAID, wherein the host subscribes to an application of the application type.

3. The method of claim 2, further comprising:
    scanning the volumes for data written to the volumes and read from the volumes; and
    evaluating the data to determine an appropriateness of the assigned level of the RAID for the application type.

4. The method of claim 3, wherein the evaluating the data comprises measuring a throughput of the data and an access rate for the application.

5. The method of claim 4, further comprising automatically migrating to another RAID level for the application if the assigned level of the RAID is inappropriate.

6. The method of claim 2, wherein the assigning the level of the RAID comprises forming RAID 0 if the application is for video production and editing, image editing, or pre-press.

7. The method of claim 6, wherein the assigning the level of the RAID comprises forming RAID 10 if the application is for a database server which requires high performance and fault tolerance.

8. The method of claim 2, wherein the assigning the level of the RAID comprises forming RAID 1 if the application is for accounting, payroll, or finance.

9. The method of claim 2, wherein the assigning the level of the RAID comprises forming RAID 3 if the application is for video production and live streaming, image editing, video editing, or pre-press.

10. The method of claim 2, wherein the assigning the level of the RAID comprises forming RAID 5 if the application is for a file and application server, a database server, a web, email and news server, or an intranet server.

11. The method of claim 2, wherein the assigning the level of the RAID comprises forming RAID 6 if the application is for a file and application server, a database server, web and email server, or an intranet server.

12. A computer readable medium for selecting a redundant array of independent disks (RAID) level having instructions that, when executed by a computer, cause the computer to perform a method comprising:
receiving setup data of an application type and a number of volumes for generating a RAID;
assigning a level of the RAID in response to the application type; and
generating the number of volumes for the assigned level of the RAID.

13. The computer readable medium of claim 12, further comprising mapping the number of volumes to a host of the RAID, wherein the host subscribes to an application of the application type.

14. The computer readable medium of claim 13, further comprising:
scanning the volumes for data written to the volumes and read from the volumes; and
evaluating the data to determine an appropriateness of the assigned level of the RAID for the application type.

15. The computer readable medium of claim 14, wherein the evaluating the data comprises measuring a throughput of the data and an access rate for the application.

16. The computer readable medium of claim 15, further comprising automatically migrating to another RAID level for the application if the assigned level of the RAID is inappropriate.

17. A redundant array of independent disks (RAID) controller coupled to a host and a plurality of drive trays of different types for selecting a RAID level, comprising:
an input module for receiving setup data of an application type and a number of volumes for generating a RAID;
a RAID select module for assigning a level of the RAID in response to the application type; and
a volume generation module for generating the number of volumes for the assigned level, wherein the number of volumes are mapped to the host of the RAID;
and wherein the host subscribes to an application of the application type.

18. The RAID controller of claim 17, wherein the application type and the number of volumes are queried via a graphical user interface on the host.

19. The RAID controller of claim 17, further comprising:
a scan module for scanning the volumes for data written to the volumes and read from the volumes; and
an evaluation module for evaluating the data to determine an appropriateness of the assigned level of the RAID for the application type.

20. The RAID controller of claim 19, further comprising a migration module for automatically migrating to another RAID level for the application if the assigned level of the RAID is inappropriate.

* * * * *